June 21, 1949.  A. J. RANDOLPH  2,473,543
APPARATUS FOR THE MANUFACTURE OF STUDS
Filed July 25, 1945  5 Sheets-Sheet 1

INVENTOR.
ARTHUR J. RANDOLPH
BY
Ralph L Chappell
ATTORNEY

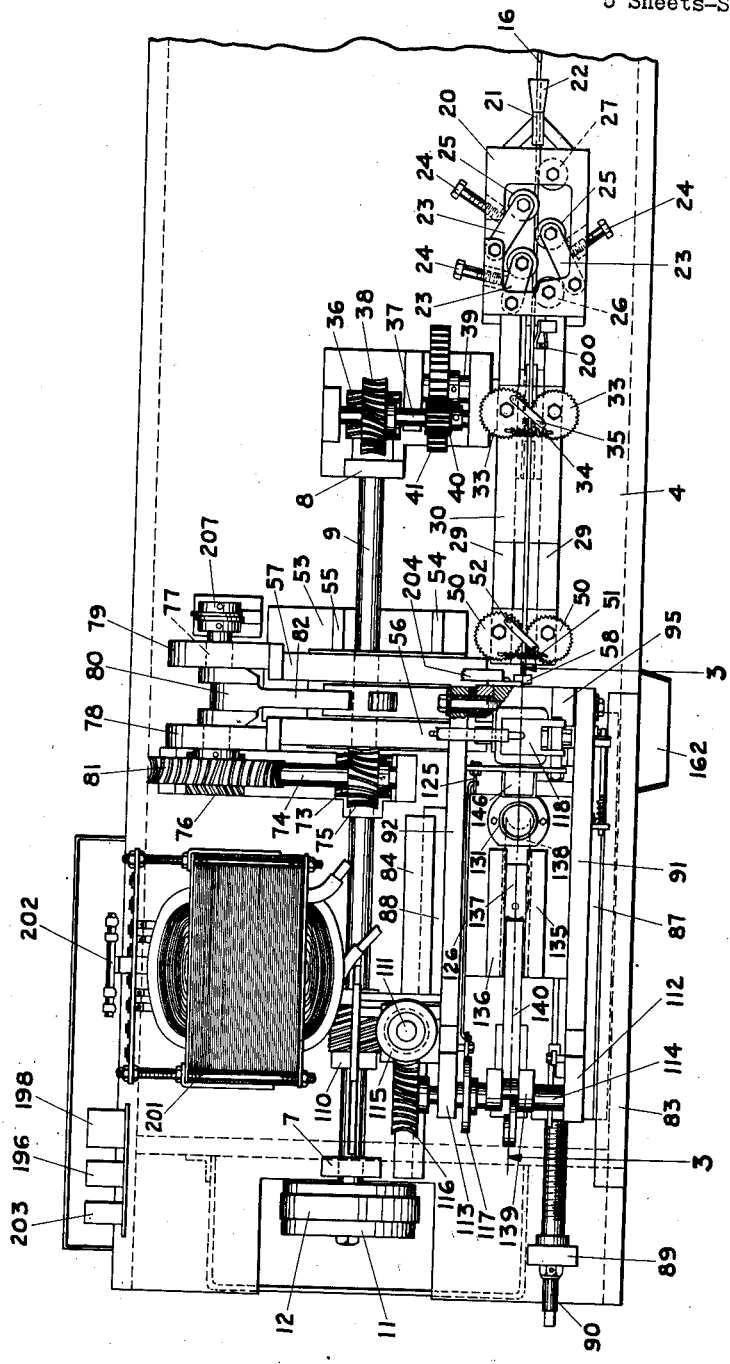

June 21, 1949.  A. J. RANDOLPH  2,473,543
APPARATUS FOR THE MANUFACTURE OF STUDS
Filed July 25, 1945  5 Sheets-Sheet 3
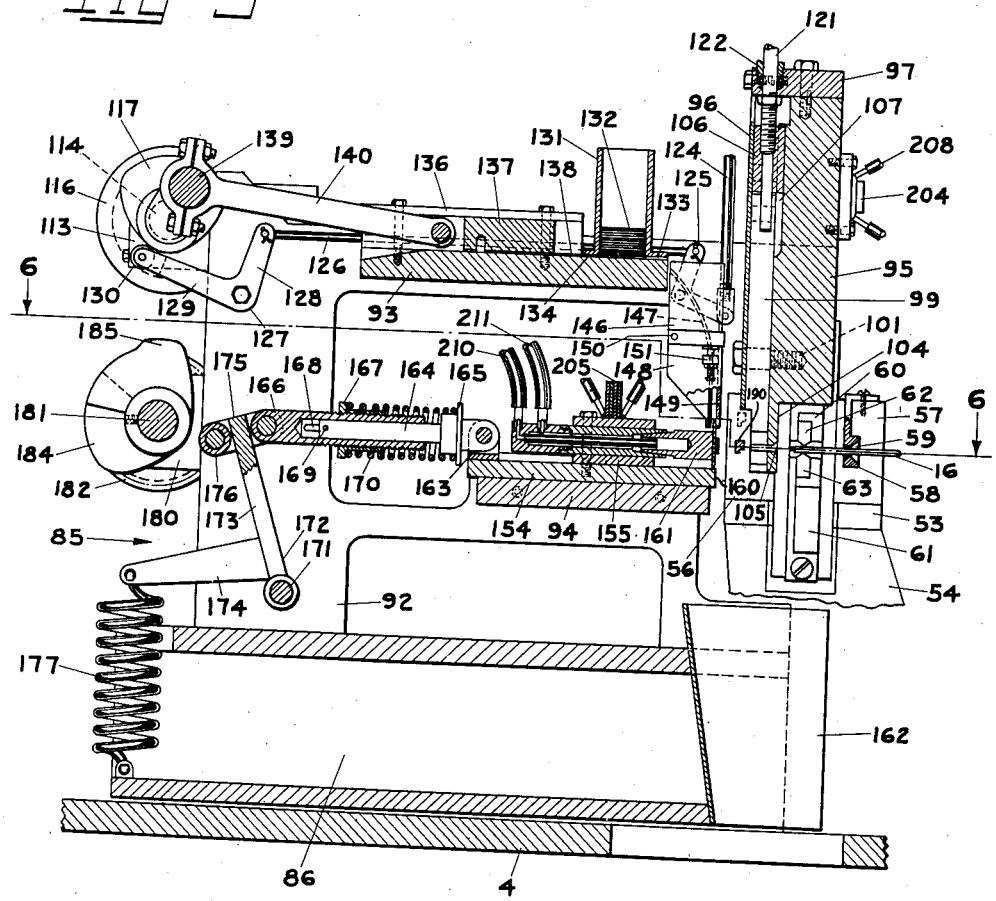
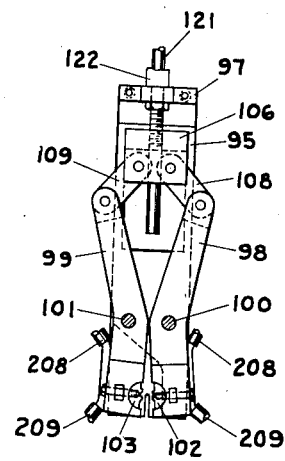
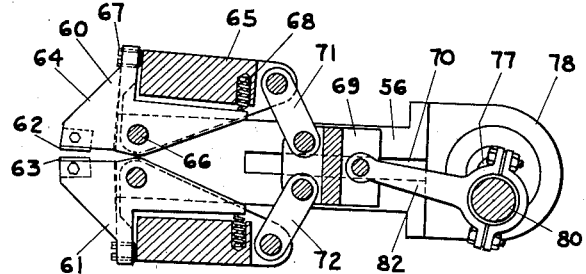
INVENTOR.
ARTHUR J. RANDOLPH
BY Ralph L. Chappell
ATTORNEY June 21, 1949.  A. J. RANDOLPH  2,473,543
APPARATUS FOR THE MANUFACTURE OF STUDS
Filed July 25, 1945  5 Sheets-Sheet 4
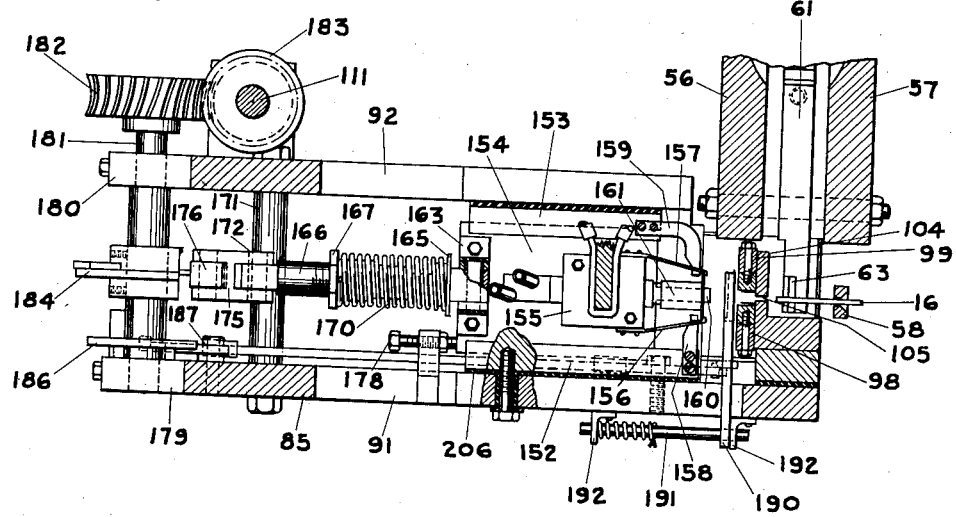
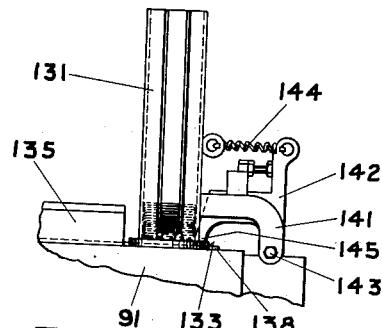
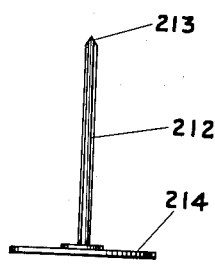
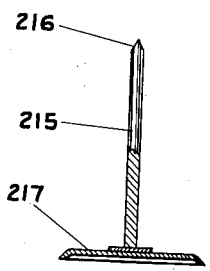
INVENTOR.
ARTHUR J. RANDOLPH
BY Ralph L. Chappell
ATTORNEY June 21, 1949.  A. J. RANDOLPH  2,473,543
APPARATUS FOR THE MANUFACTURE OF STUDS
Filed July 25, 1945  5 Sheets-Sheet 5

INVENTOR.
Arthur J. Randolph
BY
Ralph L. Chappell
ATTORNEY

Patented June 21, 1949

2,473,543

UNITED STATES PATENT OFFICE 2,473,543

APPARATUS FOR THE MANUFACTURE OF STUDS

Arthur J. Randolph, Santa Rosa, Calif.

Application July 25, 1945, Serial No. 607,072

10 Claims. (Cl. 219—4)

(Granted under the act of March 3, 1883, as amended April 30, 1928; 370 O. G. 757)

This invention relates to an apparatus for the manufacture of studs and more particularly to an automatic machine for the manufacture of studs of the type most commonly used for securing insulation material to metal walls or bulkheads or other surfaces.

A stud of the type referred to normally comprises a substantially circular sheet metal head or disc with a cylindrical shank, preferably of annealed wire, welded or otherwise firmly secured to the head centrally thereof. The head is of relatively large diameter and may have a flat surface throughout or it may have an upturned outer edge. The shank is straight and elongated and of substantially smaller diameter than the head and preferably has a chisel point.

When installed to secure insulation material to a metal surface, the shanks of the stud pass through the insulation material and their inner ends are welded to the metal surface underneath. The length of studs used for a particular piece of work is such that the heads bear firmly against the outer surface of the insulation material, the length of stud preferably being initially about 1/8 inch greater than the thickness of material in order to provide sufficient metal at the inner end to make a secure weld. The presence of upturned outer edges on the heads enables the central portions of the heads to penetrate the outer surface of the insulation material slightly to bind the material more firmly against the metal underneath and yet leave the work with a finished appearance where the edges of the heads contact the surrounding insulation material.

In the installation process, it is the usual practice to place the studs in a gun which is adapted to force the shanks through the insulation material and to electrically weld the inner ends of the shanks to the metal underneath. The provision of chisel points on the stud shanks facilitates application of the studs during this process. A chisel pointed shank is readily forced through the insulation material by the gun and, when the point strikes the metal underneath, this type of point furnishes the best contact therewith for welding purposes.

It is the principal object of the present invention to provide an apparatus for the manufacture of studs of the type referred to in which discs and wire are automatically fed into the apparatus; the end of the wire is automatically welded to a disc at regular intervals; and the wire is automatically cut to a chisel point at an appropriate distance from the disc or head to form a completed stud, which is delivered from the apparatus.

Further objects of the invention are to provide an apparatus for the manufacture of studs of the type referred to in which all parts are in a single integrated structure and in which the mechanism may be adjusted readily to vary the length of the stud produced within reasonable limits.

It is a further object of the invention to provide for carrying out the foregoing objects in an economical, facile and efficient manner.

In accomplishing these and other objects of the present invention, I have provided improved details of structure, the preferred form of which is illustrated in the accompanying drawings, wherein:

Fig. 2 is a top plan view of the apparatus, omitting the reel used to carry the supply of wire.

Fig. 3 is a vertical sectional view of a portion of the apparatus taken substantially on the line 3—3 of Fig. 2.

Fig. 4 is a side elevational view of the wire gripping means preferably employed in the apparatus.

Fig. 5 is a side elevational view of the wire cutting means preferably employed in the apparatus.

Fig. 6 is a horizontal sectional view of a portion of the apparatus taken substantially on the line 6—6 of Fig. 3.

Fig. 7 is a side elevational view of the disc magazine preferably employed in the apparatus, with a mechanism which is preferably used therewith for feeding discs having upturned outer edges.

Fig. 8 is a side elevational view of a completed stud of the type manufactured by the apparatus, the stud being of the type having a completely flat head.

Fig. 9 is a side elevational view, partly in section, of a completed stud of the type manufactured by the apparatus, the stud being of the type in which the head has an upturned outer edge.

Referring more in detail to the drawings:

Preferably, wire is fed into the apparatus from one end thereof. For convenience in describing the apparatus, I shall refer to the end from which the wire enters as the "rearward end" and the opposite end as the "forward end." The rearward end is at the right in Fig. 1 and the forward end at the left. Also I shall refer to the side of the apparatus seen in Fig. 1 as the "front" and the opposite side as the "back." I shall locate various mechanisms in the apparatus by referring to their location as being successively forward of the rearward end and successively behind the front side.

The apparatus is preferably supported on a frame 1. Preferably the frame 1 is table-like in form, having a forward pair of legs 2, a rearward pair of legs 3 and a substantially rectangular top member 4, which provides a bed for supporting the operating parts of the apparatus, Fig. 1. Preferably the component parts of the frame 1 are of metal plate suitably cut to shape and secured together by welding to furnish a firm support for the apparatus.

Figure 1:
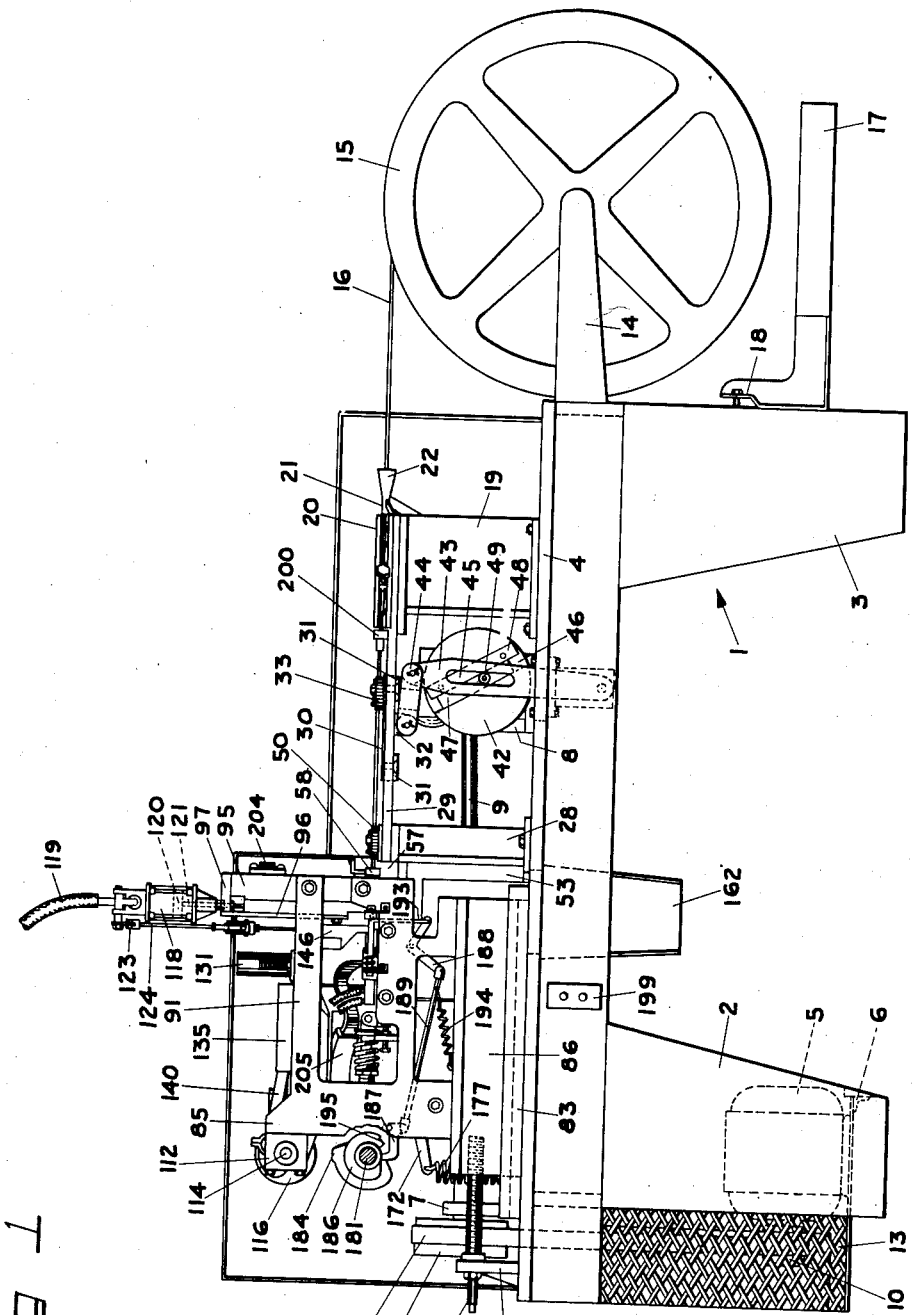
Fig. 1 is a front elevational view of an apparatus for the manufacture of studs embodying the principles of my invention.

A motor 5, preferably electrically driven, is suitably supported on the frame 1, preferably on a shelf 6 extending between the forward pair of legs 2 adjacent the lower ends thereof, Fig. 1.

A forward bearing block 7 and a rearward bearing block 8 are suitably secured to the top member 4 of the frame 1. A horizontally disposed drive shaft 9 is rotatably mounted in the bearing blocks 7 and 8 and is operatively connected with the motor 5 to rotate therewith. The drive shaft normally rotates in a counter-clockwise direction as viewed from the forward end of the apparatus (the end at the left as viewed in Fig. 1), although it will be obvious that the direction could be reversed with proper adjustment of parts in the apparatus.

I have shown the operative connection for transmitting rotary motion from the motor to the drive shaft as comprising a pulley 10 on the motor 5, a pulley 11 on the drive shaft 9 and a belt 12 passing over the pulleys 10 and 11 through a suitable aperture in the top member 4 of the frame 1, although it is apparent that other well known means for transmitting rotary motion could be employed. Preferably, the pulley 10 and the lower portion of the belt 12 are covered by a screen or grating 13 suitably secured to the frame 1.

The essential operating parts of the apparatus include a wire feeding mechanism, a wire cutting mechanism, a wire gripping mechanism, a disc feeding mechanism and a welding mechanism In addition, I prefer to include a means for carrying a supply of wire, a wire straightening mechanism, an anti-return mechanism, a means for carrying a supply of discs, and an extractor mechanism. Preferably the wire feeding mechanism, the wire cutting mechanism, the wire gripping mechanism, the disc feeding mechanism, the welding mechanism and the extractor mechanism are operatively connected with the drive shaft 9. I shall hereinafter describe the structure and operation of these various mechanisms.

Secured to the rearward portion of the frame 1, as by welding, are a pair of arms 14, Fig. 1. Rotatably mounted between the arms 14 is a reel 15 adapted to carry a supply of wire 16 wound therearound. Preferably the reel 15 is frictionally retained to prevent undesired rotation; that is, the reel does not rotate except when an actual force is exerted thereon tending to rotate it, as when the wire feeding mechanism, described hereinafter, draws the wire from the reel into the apparatus.

The wire 16 is used in the apparatus to form the shanks of studs made by the apparatus and is fed to the operating parts thereof from the reel 15. It follows that the wire 1 should be of a type suitable for such purpose. I have found that an annealed steel wire of diameter approximately 0.135 inch is satisfactory, although obviously use of the apparatus is not limited to this type or size of wire.

Preferably a lubricant is applied to the wire 16 on the reel 15 to facilitate passage of the wire through the apparatus. I prefer to include a pan 17 removably secured to the rearward legs 3, as by the studs 18, to retain any excess lubricant that drips from the reel.

As the wire leaves the reel 15, it first preferably passes through a straightening mechanism adapted to remove any kinks that may be present.

The straightening mechanism is mounted on a pedestal 19, the lower end of which is secured to the top member 4 of the frame 1 forwardly of the reel 15, Fig. 1. Secured to the top of the pedestal 19 is a plate 20 which preferably has a cut-out in the central portion thereof, Fig. 2.

Secured to the upper rearward portion of the pedestal 19 is a tube 21, preferably of metal and having a funnel-shaped rearward end 22. Pivotally mounted on the plate 20 and extending into the cutout therein are a plurality of arms 23, preferably three in number. The latter may pivot freely inwardly, but outward pivotal movement thereof is limited by engagement with set screws 24, one of which is threadedly engaged in the plate 20 in cooperative relation to each arm 23. Rotatably mounted on each arm 23 is a sheave 25. An additional pair of sheaves 26 and 27 are rotatably mounted in the plate 20. Each of the sheaves 25, 26 and 27 preferably has a groove extending around its circumference substantially in horizontal alignment with the forward end of the tube 21. The preferred arrangement of sheaves is clearly shown in Fig. 2.

As the wire 16 enters the straightening mechanism, it first passes through the tube 21 where any large kinks are removed. Next the wire passes over the plurality of sheaves 25, 26 and 27. The set screws 24 are adjusted so that the sheaves 25 bear inwardly against the wire and force it to bend back and forth substantially in a horizontal plane. The bending of the wire over the sheaves removes any kinks not removed by the tube 21. As the wire emerges from the most forward sheave 26, the tension in the wire due to the pull exerted thereon by the feeding mechanism straightens the wire.

After the wire 16 leaves the straightening mechanism, it enters the wire feeding mechanism which is supported on the frame 1 forwardly of the straightening mechanism.

A second pedestal 28 is secured at its lower end to the top member 4 of the frame 1 forwardly of the pedestal 19 and in spaced relation thereto, Fig. 1. A pair of horizontally disposed rails 29 are fixedly secured across the upper ends of the pedestals 19 and 28 and are positioned in spaced parallel relation to each other to leave a longitudinally extending opening therebetween.

A plate 30 is slidably supported on the rails 29 and has forward and rearward depending portions 31 and a central depending portion 32 fitted within the longitudinal opening between the rails to guide movement thereon, Figs. 1 and 2. Rotatably mounted on the upper face of the plate 30 are a pair of wheels 33, which have serrated edges preferably extending around their circumferences. The wheels 33 are eccentrically mounted and are connected by a coiled tension spring 34 adjacent their forward portions and a link 35 extending diagonally between the forward portion of one wheel and the rearward portion of the other, Fig. 2.

When the plate 30 is moved forwardly, the serrated edges of the wheels 33 bear against the wire 16 and tend to rotate thereagainst on their eccentric mountings. The rotation that occurs moves the portions of the wheels having increased radii of rotation into contact with the wire and the serrated edges on the circumference grip the wire and draw it forward with the plate. When the plate 30 is moved rearwardly, the wheels 33 tend to rotate in the opposite direction or to positions such that the portions of the wheels having smaller radii of rotation are contiguous to the wire. The wire is thus released on the rearward movement of the plate. The spring 34 draws together the portions of the wheels having the increased radii of rotation, thus assuring that the serrated edges grip the wire on the forward movement of the plate. The link 35 retains the wheels 33 in correct relative position.

The plate 30 is operatively connected with the drive shaft 9 so that the plate is automatically moved forwardly and rearwardly by rotation of the shaft to feed wire intermittently into the apparatus.

Keyed to the drive shaft 9 adjacent the rearward end thereof to rotate therewith is a worm gear 36, Fig. 2. A horizontally disposed shaft 37, transverse to the drive shaft 9, is mounted to rotate in suitable bearings on the top member 4 of the frame 1. Keyed to the shaft 37 is a worm wheel 38, the teeth of which mesh with those of the worm gear 36. A horizontally disposed shaft 39, substantially parallel to the shaft 37, is also mounted to rotate in suitable bearings on the top member 4 of the frame 1. The shaft 39 is geared to the shaft 37 to rotate therewith through suitable speed reduction gears 40 and 41. The shaft 39 carries a wheel 42 adjacent the outer end to rotate therewith.

An arm 43 is pivoted adjacent its lower end to a suitable bearing on the top member 4 of the frame 1, preferably on the under side thereof, and is connected adjacent its upper end to the central depending portion 32 of the plate 30 by means of the link 44, Fig. 1. The arm 43 has a longitudinal slot 45 extending through a portion of its length.

The wheel 42 has a substantially diametric slot 46 extending across the outer face thereof. Fitted within the slot 46 are a slide member 47 and a clamp member 48. The slide member 47 may be adjusted across the length of the slot 46 and is held in adjusted position by the clamp member 48.

The slide member 47 carries a roller 49 rotatably mounted on the outer face thereof and fitted within the slot 45 in the arm 43. The slide member 47 is adjusted so that the center of the roller 49 is eccentric to the center of the wheel 42.

Rotation of the wheel 42 with the roller 49 riding in the slot 45 imparts an oscillatory movement to the arm 43. This movement is transmitted to the plate 30 by the link 44 which is connected between the upper portion of the arm 43 and the central depending portion 32 on the plate 30. The plate 30 is thus moved forwardly and rearwardly by the oscillatory movement of the arm 43 to feed wire intermittently into the apparatus.

It is desirable that the forward or feed stroke of the plate should take place in as short a time as possible in order that a minimum amount of time is consumed by the wire feeding process. The period of time elapsing during the return stroke of the plate should be longer than the forward feed stroke since other steps in the studmaking process occur during the return stroke.

With the drive shaft rotating in a counterclockwise direction as viewed from the forward end of the apparatus, it is seen that the wheel 42 rotates in a clockwise direction as viewed from the front, Fig. 1. With the wheel 42 rotating in such direction, the forward stroke of the plate occurs as the roller 49 rides through the slot 45 in the portion thereof closest to the pivot point on which the arm 43 oscillates and the return stroke occurs as the roller 49 rides through the slot 45 in the portion thereof farthest from the pivot point. This relationship allows the forward stroke to take place in less time than the rearward stroke, since a smaller portion of the arc of rotation of the wheel 42 is utilized in the former than in the latter.

When it is desired to vary the length of wire fed into the apparatus per stroke and thereby adjust the length of shank of studs made by the apparatus, it is merely necessary to adjust the eccentricity of the roller 49 on the wheel 42. Increase in such eccentricity increases the length of stroke of the plate 30 and hence increases the length of wire fed with each stroke, since the length of wire fed per stroke is equivalent to the length of the stroke. Decrease in eccentricity does the reverse. The eccentricity may be adjusted by loosening the clamp member 48 in the slot 46 on the face of the wheel 42 and moving the slide member 47 in the slot until the roller 49 on the slide member has the desired eccentricity. The clamp member 48 is then retightened.

I prefer to include an anti-return mechanism in the apparatus to positively prevent return movement of the wire 16 on the rearward stroke of the plate 30 of the feeding mechanism.

The anti-return mechanism comprises a pair of wheels 50 eccentrically mounted on the top of the pedestal 23 in substantial horizontal alignment with the wheels 33 of the feeding mechanism. Preferably the wheels 50 are substantially similar structurally to the wheels 33. They are preferably serrated around their circumferential edges and connected by a coiled tension spring 51 extending between their forward portions and by a link 52 extending diagonally between the forward portion of one and the rearward portion of the other, the connecting arrangement also being substantially similar to that between the wheels 33 of the feeding mechanism.

When the wire 16 is being moved forwardly due to the push thereon by the feeding mechanism, the wheels 50 tend to rotate on their eccentric mountings so that the portions thereof having small radii of rotation are contiguous to the wire. In this condition the wheels do not grip the wire 16 and the latter is free to pass therebetween in a forward direction. On the rearward or return stroke of the plate 30 any rearward movement of the wire 16 tends to rotate the wheels 50 in such a manner that the portions thereof having larger radii of rotation are contiguous to the wire and the serrated edges grip the wire preventing further rearward movement thereof. The provision of the spring 51 assures that the serrated edges of the wheels 50 bear against the wire so that any return movement thereof will tend to rotate the wheels through the small arc required for the wheels to grip the wire. The link 52 retains the wheels in correct relative position at all times.

Forwardly of and behind the second pedestal 28 is a third pedestal 53, which preferably has leg portions 54 and 55 that straddle the drive shaft 9 and are suitably secured at their lower ends to the top member 4 of the frame 1. The top of the third pedestal 53 is in a substantially horizontal plane and is elongated in a front to back direction.

Secured along the top of the third pedestal are a pair of rails 56 and 57 which are horizontally disposed and extend in a front to back direction and are positioned in spaced parallel relation to each other. The rails 56 and 57 form a guide block for the wire cutting mechanism and the rail 57 also furnishes a support for a wire guide 58 through which the wire 16 preferably passes before entering the cutting mechanism in order that it may be directed accurately thereinto.

The wire guide 58 preferably comprises an inverted L-shaped member secured to the rail 57. The depending portion of the guide 58 has an aperture 59 therethrough which is enlarged toward the rearward end to facilitate ingress of the wire 16, Fig. 3. The guide 58 thus directs the wire accurately into the cutting and gripping mechanisms about to be described.

The details of the cutting mechanism are best shown in Fig. 5. The mechanism comprises upper and lower movable jaws 60 and 61 respectively pivoted to the rails 56 and 57 in the space therebetween. The jaws 60 and 61 preferably support removable and replaceable cutting blades 62 and 63, respectively, secured thereto. One of the blades 62 or 63 preferably has a relatively flattened cutting edge while the other blade preferably has a relatively sharp cutting edge. This arrangement of a flat cutting edge and a sharp cutting edge facilitates cutting the wire to the desired chisel point.

Preferably the jaws 60 and 61 are made in two parts to permit adjustment in the distance by which the blades clear when the jaws are closed. This adjustability is desirable for the reason that the blades 62 and 63 wear during usage and should therefore be ground and brought closer together when they become worn. The upper jaw comprises a first element 64 and a second element 65, both pivoted to the rails 56 and 57 on the spindle 66. A set screw 67 is threadedly engaged with the first element 64 and bears against the outside edge of the second element 65. A coiled compression spring 68 is fitted within a bore in the second element 65 and bears against the upper edge of the first element 64. The two part construction of the lower jaw 61 is similar to that of the upper jaw 60 and hence is not described in detail. Adjustment in the distance by which the jaws clear each other may be made by rotating either or both of the set screws.

A crosshead 69 is slidably supported between the rails 56 and 57. Preferably the rail 56 has a longitudinally extending groove 70 on the inner face thereof and the rail 57 has a similar groove not shown. The crosshead 69 preferably has protruding portions that are slidably fitted within these grooves to support it and guide its movement. The crosshead 69 is connected to the second element 65 of the upper jaw 60 by means of a link 71 which is respectively pivoted adjacent its ends to each of these members. The crosshead 69 is similarly connected to the lower jaw by a link 72.

The crosshead 69 is operatively connected with the drive shaft 9 so that it automatically reciprocates in the guide block formed by the rails 56 and 57 upon rotation of the drive shaft. Keyed to the drive shaft 9 is a worm gear 73, Fig. 2. A horizontally disposed transverse shaft 74, substantially perpendicular to the drive shaft 9, is suitably supported for rotation on the top member 4 of the frame 1 and carries a worm wheel 75, the teeth of which mesh with those of the worm gear 73. The shaft 74 also carries a worm gear 76 keyed thereto. A crank shaft 77 is suitably supported for rotation in bearing members 78 and 79, secured to the back ends of the rails 56 and 57 respectively and has a crank 80 thereon and a worm wheel 81 keyed thereto. The teeth of the worm gear 76 mesh with those of the worm wheel 81. Rotation of the drive shaft 9 is thus transmitted to the crank shaft 77. A connecting rod 82 is pivotally connected at its respective ends to the crank 80 and the crosshead 69, Fig. 5. Rotation of the crank shaft 77 thus causes the crosshead 69 to reciprocate within the guide block formed by the rails 56 and 57. The reciprocating motion of the crosshead 69 rocks the jaws about their pivots on the rails 56 and 57 and thus periodically closes and opens these jaws.

The jaws 60 and 61 are closed as the crosshead 69 travels toward the front of the apparatus and opened as the crosshead travels in the opposite direction. Operation of the apparatus is synchronized so that the jaws close to cut the wire after the completion of each forward or feed stroke of the plate 30 just as the rearward or return stroke starts.

There is a small rearward movement imparted to the wire 16 by the cutting action, since the blades in cutting a chisel point tend to force the wire outwardly therefrom. The amount of rearward movement imparted to the wire 16 by the cutting operation is substantially equivalent to the amount of such movement required for the wheels 50 of the anti-return mechanism to grip the wire to positively prevent further return movement.

The cutting mechanism is preferably supported in a position fixed forwardly and rearwardly of the frame 1. The segments cut from the wire 16 forwardly of the cutting blades 62 and 63 form the stud shanks and are equivalent in length to the length of wire fed into the apparatus with each feed stroke of the plate 30 of the wire feeding mechanism. The wire gripping mechanism, described hereinafter, grips the cut segment at a distance from the forward end thereof just sufficient to furnish metal in the wire to be upset and welded to a disc and the welding mechanism, also described hereinafter, welds a disc to the forward end of the segment that protrudes beyond the gripping mechanism. Since provision is made for varying the length of wire fed into the apparatus per feeding stroke, it is desirable also to provide for forward and rearward adjustment of the wire gripping mechanism, the disc feeding mechanism, and the welding mechanism in order that these mechanisms may be positioned correctly with respect to the forward end of the cut segment of wire. I therefore preferably provide a support for these various mechanisms that may be adjusted forwardly and rearwardly of the frame 1 to compensate for any adjustments made in the length of wire fed per feeding stroke.

Suitably secured to the forward portion of the top member 4 of the frame 1 are a front guide rail 83 and a back guide rail 84. The guide rails 83 and 84 are preferably of inverted L-shape in cross section and are positioned in spaced parallel relation to each other and are substantially parallel to the front and back edges of the top member 4, Fig. 2.

A carriage 85 is slidably supported on the top member 4 of the frame 1 for forward and rearward adjustment thereon. The carriage 85 comprises a base 86 that has front and back protruding portions 87 and 88 respectively fitted within the front and back guide rails 83 and 84 on the frame 1 to guide adjustment of the carriage on the frame.

An upstanding bearing member 89 is suitably secured to the top member 4 of the base 1. A shaft 90, threaded for a portion of its length, is rotatably mounted in the bearing member 89 and threadedly engaged in a suitably tapped opening in the base 86 of the carriage 85, Figs. 1 and 2. The position of the carriage 85 on the frame 1 may thus be adjusted forwardly or rearwardly by manual rotation of the shaft 90.

The carriage 85 also comprises upstanding front and back side members 91 and 92, respectively, suitably secured to the base 86 and a horizontally disposed top member 93 and shelf member 94 suitably secured between the front and back members 91 and 92, Fig. 3. The members 91, 92, 93 and 94 provide support means for the various mechanisms mounted on the carriage.

The wire gripping mechanism, shown in detail in Fig. 4, is preferably supported on the carriage 85 adjacent the rearward end thereof and forwardly of the cutting mechanism.

The wire gripping mechanism comprises an upstanding rearward plate 95, preferably of copper or brass or other metal that is a good electrical conductor, and a forward plate 96 secured in spaced parallel relation to the plate 95. The rearward plate 95 is preferably suitably secured between the side members 91 and 92 of the carriage 85 adjacent their rearward ends. The forward plate 96 is preferably secured to the rearward plate 95 by a spacer element 97, Fig. 3.

A pair of gripping jaws 98 and 99, preferably of metal that is a good electrical conductor, are pivoted between the plates 95 and 96 on the spindles 100 and 101 respectively. The spindles are preferably in the form of bolts that are threadedly engaged in suitably tapped openings in the plate 95 and extend through the plate 96. The jaws 98 and 99 preferably are equipped with removable and replaceable inserts 102 and 103, also of a metal that is a good electrical conductor, that are notched to hold the wire 16 during the gripping operation.

Preferably the plate 95 has a downwardly extending portion 104 which is of reduced thickness to clear the cutting mechanism, Fig. 3. The portion 104 of the plate 95 has an aperture 105 therethrough which preferably has an enlarged rearward end and is aligned with the aperture 59 in the wire guide 58. The aperture 105 directs the wire 16 into the desired position between gripping jaws 98 and 99. When the jaws are closed, the space within the notches in the inserts 102 and 103 is aligned with the aperture 105.

A crosshead 106 is fitted into the space between the plates 95 and 96 and is vertically slidably therein. The plate 95 preferably has a cut-out portion 107 in the inner face thereof to form a guide for directing vertical movement of the crosshead 106, Fig. 3. The crosshead 106 is connected to the gripping jaws 98 and 99 by the links 108 and 109 respectively, which are pivoted adjacent their ends to the crosshead and to the upper end portions of the gripping jaws. Vertical movement of the crosshead thus closes and opens the jaws to alternately grip or release the wire.

The gripping mechanism is operatively connected with the drive shaft 9 in such a manner that it is automatically actuated to grip the wire segment before the cutting mechanism cuts the segment from the main length of wire, that it retains the segment while a disc is being welded to the end thereof, and so that it is automatically actuated to release the segment after the disc has been welded thereto to form a completed stud.

A worm gear 110 is slidably keyed to the drive shaft 9 for adjustment thereon as the carriage 85 is adjusted longitudinally on the frame 1 and rotates therewith, Fig. 2. Rotatably mounted in suitable bearings on the back side member 92 of the carriage 85 is a vertically disposed shaft 111. Keyed to the shaft 111 adjacent the lower end thereof is a suitable worm wheel, not shown, the teeth of which mesh with those of the worm gear 110 to rotate the shaft 111.

Rotatably mounted in suitable bearings 112 and 113 secured to the forward edges of the front side member 91 and the back side member 92 respectively of the carriage 85 and extending between these members is a horizontally disposed transverse shaft 114. Keyed to the vertically disposed shaft 111 is a worm gear 115 and keyed to the horizontally disposed shaft 114 is a worm wheel 116, the teeth of which mesh with those of the worm gear 115 to rotate the shaft 114. The shaft 114 has a cam 117 mounted thereon to rotate therewith to actuate the wire gripping mechanism.

Preferably the wire gripping mechanism is pneumatically operated. Such operation permits ready adjustment of the pressure applied to the wire by the gripping jaws and furnishes a convenient means for closing the jaws quickly and opening them quickly at the proper time in the operation of the apparatus.

A double acting pneumatic cylinder 118, which may be of any suitable type known in the art, is preferably mounted on the spacer element 97, and is adapted to be connected to a suitable source of air under pressure by the air line 119, Fig. 1. The cylinder contains a vertically slidable piston 120 which is connected to the crosshead 106 by the piston rod 121. The spacer element 97 has an aperture therethrough in which is preferably secured a bushing 122 through which the piston rod 121 passes. The air from the line may act either on the upper face of the piston 120 to lower the crosshead 106 and thus close the gripping jaws 98 and 99 to grip the wire, or on the lower face of the piston 120 to raise the crosshead and thus open the jaws to release the wire. The direction of operation of the piston 120 is controlled by a valve 123 which may be of any suitable type known in the art.

Connected to the valve 123 is an operating rod 124. A crank 125 is pivotally mounted on the carriage 85, preferably on the inner face of the back side member 92, Fig. 3. The crank 125 preferably has two arms extending substantially at right angles to each other and is preferably pivoted to the member 92 adjacent the juncture of these arms. One arm of the crank 125 is pivotally connected to the operating rod 124. The other arm of the crank 125 is pivotally connected to the rearward end of a horizontally disposed rod 126.

A cam crank 127 is pivotally mounted on the carriage 85 adjacent the forward end thereof, preferably also on the inner face of the back side member 92, Fig. 3. The crank 127 preferably has two arms 128 and 129 extending substantially at right angles to each other to function as cam followers and is preferably pivoted to the member 92 adjacent the juncture of these arms. The arm 128 of the crank 127 is pivotally connected to the forward end of the rod 126. The arm 129 of the crank 127 preferably carries a roller 130.

With the drive shaft 9 rotating in a counter-clockwise direction as viewed from the forward end of the apparatus, it is seen that the shaft 114 and cam 117 rotate in a counter-clockwise direction as viewed from the front, Fig. 3. When the cam 117 abuts against the roller 130 and arm 129 of the crank 127, it pushes the arm downwardly and thus rotates the crank in a counter-clockwise direction as viewed in Fig. 3. Such rotation of the crank 127 moves the rod 126 forwardly or to the left as viewed in Fig. 3. Such movement of the rod 126 rotates the crank 125 in a counter-clockwise direction as viewed in Fig. 3. Such rotation of the crank 125 elevates the operating rod 124 to actuate the valve 123 in such manner that the air pressure is directed against the upper face of the piston 120. The piston is forced downwardly thus closing the gripping jaws 98 and 99.

As rotation of the shaft 114 and cam 117 continue, the cam 117 abuts against the arm 128 of the crank 127. The cam 117 then pushes the arm 128 rearwardly or to the right as viewed in Fig. 3 and thus rotates the crank 127 in a clockwise direction. Such rotation moves the various elements of the gripping mechanism in a direction opposite from the direction of movement discussed in the paragraph preceding and the valve 123 is actuated in such manner that the air pressure is directed against the lower face of the piston 120. The gripping jaws 98 and 99 are thus opened.

Secured to the top member 93 of the carriage 85 is a magazine 131 comprising a cylindrical tube preferably having a cut-out in the front wall and being open at the top and bottom ends. The magazine 131 is adapted to receive a supply of discs 132 used to form the heads of studs made by the apparatus. The discs 132 may be inserted manually in the magazine 131 through the open top thereof as needed. The discs 132 are shown in Figs. 1 and 3 as being of the completely flat type, but they may be of the type having an upturned outer edge, as shown in Fig. 7. They are formed of sheet metal, ordinarily steel, cut to substantially circular shape.

The magazine 131 has a delivery opening 133 in the rearward side at its lower end and a second opening 134 at the opposite side through which discs are pushed singly through the delivery opening by means about to be described.

Secured to the top member 93 of the carriage 85 forwardly of the magazine 131 are a pair of spaced opposed guide members 135 and 136, Fig. 2. A slide member 137 is mounted for reciprocating movement on the top member 93 and is guided in such movement by the guide members 135 and 136. Secured to the rearward end of the slide 137 is a flat and relatively thin plunger 138, preferably of sheet metal, adapted to be shoved into the magazine 131 through the opening 134 and to feed discs singly therefrom through the opening 133.

The slide member 137 is operatively connected with the shaft 114, and hence with the drive shaft 9, in such a manner that it automatically reciprocates to feed discs singly from the magazine at the proper intervals. The shaft 114, hereinbefore described, has a crank 139 thereon alongside the cam 116, Fig. 3. A connecting rod 140 is pivotally connected adjacent its ends to the crank 139 and to the forward end portion of the slide member 137.

Rotation of the shaft 114 thus alternately pushes the plunger 138 through the opening 134 in the magazine 131 to feed a disc 132 through the opening 133 and withdraws the plunger so that the discs drop down on the member 93 and another disc is in position to be fed.

When the discs are of the type having an upturned edge, it is desirable to employ a mechanism to raise all of the discs, except the one being fed, during the feeding stroke of the plunger 138. Such a mechanism is illustrated in Fig. 7. It comprises a pair of inverted L-shaped brackets 141 secured to the rearward side of the magazine 131 and a dog 142 pivoted to the brackets on a bearing stud 143. A tension spring 144 connected between the dog 142 and the magazine 131 normally urges the toe 145 of the dog downwardly. When the plunger 138 moves rearwardly or inwardly and starts to push a disc through the opening 133, the toe 145 of the dog 142 rides over the bevelled upper surface of the disc being fed and under the disc thereabove and is thereby raised. While in raised position, the dog supports all of the discs, except the one being fed, in a raised position. When the plunger 138 is withdrawn from the magazine 131, the spring 144 pulls the toe 145 of the dog 142 downwardly thus allowing the stack of discs to drop down. In its lowered position the toe 145 is rearwardly of the discs so that it may pass over the bottom disc in the next feeding operation.

When a disc has been fed from the magazine 131, it drops into a chute 146 which is suitably secured to the carriage 85 and has a sloping bottom member 147, side members 148 and a rear member 149, Fig. 3. The disc is guided downwardly by the bottom member 147 into a disc securing means hereinafter described. The rear member 149 is preferably pivoted to the side members 148 at 150 so that it may be opened to remove an imperfect disc that might become lodged in the chute. Adjustable bolts 151 normally hold the rear member 149 in closed position.

Secured to the upper face of the shelf member 94 of the carriage 85 are a pair of horizontally disposed spaced opposed guide members 152 and 153 extending in a forward and rearward direction, Fig. 6. A slide member 154 is mounted for reciprocating movement between retracted and extended positions on the shelf member 94 and is guided in such movement by the guide members 152 and 153. The retracted position of the slide member 154 is toward the left as viewed in Fig. 3 and the extended position is toward the right. The slide member 154 carries a disc securing means and a welding electrode, both hereinafter described.

The slide member 154 has an upstanding portion 155 centrally thereof. Secured to the front and back sides of the upstanding portion 155 are a pair of spring clips 156 and 157 that have inwardly protruding portions at their rearward ends, Fig. 6. A pair of arms 158 and 159 are secured to the guide members 152 and 153 respectively and cooperate with the spring clips 156 and 157 respectively to spread the clips when the slide member 154 is in retracted position. A lip 160, preferably integral with the base of the slide member 154, extends below the space within the spring clips. A welding electrode 161, described more in detail hereinafter, is secured to the rearward end of the upstanding portion 155 of the slide member 154 and terminates just short of the plane of the inwardly protruding portions of the spring clips 156 and 157.

When the slide member 154 is in retracted position, the space bounded by the end of the electrode 161, the spring clips 156 and 147, and the lip 160 is substantially aligned with the outlet of the chute 146. While the space is so aligned, a disc is fed thereinto and secured therein by the respective elements. When the slide member moves rearwardly or inwardly toward its extended position from its retracted position, the arms 158 and 159 release the spring clips 156 and 157 and the latter spring inwardly to retain the disc securely in position.

In the extended position of the slide, the center of the disc held within the disc securing means contacts the forward end of the wire held by the wire gripping jaws 98 and 99. After such contact has been made, a welding circuit, hereinafter described, is closed and the disc is welded to the wire to form a completed stud. The wire segment, which has now become a stud shank, is retained momentarily by the gripping jaws 98 and 99 while the slide member starts its travel back to retracted position. The spring clips 156 and 157 are pulled out of engagement from the disc, which has now become a stud head. The completed stud is free to drop from the apparatus from the delivery chute 162.

Means are provided for automatically moving the slide 154 from the retracted position to the extended position and returning it to the retracted position all at the proper times during the operation of the apparatus.

The slide 154 preferably has a second upstanding portion 163 adjacent the forward end thereof, Fig. 3. Secured to the upstanding portion 163 is an elongated spindle 164 that has a collar 165 adjacent its rearward end. A spindle 166, having a longitudinal bore in its rearward end, is slidably fitted over the forward end of the spindle 164 with the latter extending into the bore. The spindle 166 carries a collar 167, preferably threadedly engaged thereon to permit adjustment, and has slots 168 in diametrically opposed side walls. A pin 169 is secured in a diametric aperture in the spindle 164 and rides in the slots 168 in the spindle 166 to limit relative sliding movement between the spindles and to transmit forward movement of the spindle 166 to the spindle 164. A coiled compression spring 170 is fitted between the collars 165 and 167 and normally urges the spindles 164 and 166 apart to the limit permitted by engagement of the pin 169 with the rearward end of the slot 168.

A horizontally disposed transverse bearing shaft 171 is connected between the front and back side members 91 and 92 of the carriage 85, Figs. 3 and 6. A crank 172 is pivoted to the bearing shaft 171. The crank 172 preferably has arms 173 and 174 extending substantially at right angles to each other and is pivoted to the shaft 171 adjacent the juncture of these arms, Fig. 3. The arm 173 preferably terminates in a T portion 175. The spindle 166 is pivoted to the rearward end of the T portion 175. The forward end of the T portion 175 preferably carries a roller 176 which functions as a cam follower. A coiled tension spring 177 is connected between the arm 174 of the crank 172 and base 86 of the carriage 85.

It is seen that the spring 177 urges the arm 174 of the crank 172 downwardly. The arm 173 of the crank 172 is thus urged forwardly and thus normally retains the slide 154 in forward or retracted position.

Forward movement of the slide 154 is limited by engagement of the slide with a suitable stop 178, preferably in the form of a bolt threaded into a suitable bearing on the front side member 91 of the carriage, Fig. 6. The threaded engagement of the stop enables the retracted position of the slide 154 to be adjusted slightly so that the disc securing means thereon may be aligned accurately with the outlet of the chute 146.

Rotatably mounted in suitable bearings 179 and 180 secured to the forward edges of the front side member 91 and the back side member 92 respectively of the carriage 85 and extending between these members is a horizontally disposed transverse shaft 181, Figs. 3 and 6. Keyed to the shaft 181 is a worm wheel 182. The vertically disposed shaft 111 has keyed thereto a worm gear 183, the teeth of which mesh with those of the worm wheel 182. Rotation of the drive shaft 9 is thus transmitted to the transverse shaft 181, rotation being in a counter-clockwise direction as viewed in Fig. 3.

The shaft 181 carries a cam 184 which rotates therewith. The cam 184 acts periodically on the roller 176 to move the slide 154 to its extended position against the action of the spring 177. The spring 170 provides a cushioning effect during the inward movement of the slide.

During the welding operation, after the current has been cut off, it is desirable to increase the pressure between the disc and wire to insure a secure weld. I have provided for such increase in pressure by including on the cam 184 a portion 185 having a radius greater than the radius of the rest of the cam. When this portion of the cam contacts the roller 176 on the crank 172, the spring 170 is compressed to a greater extent and thus a greater pressure is applied to the disc. Thereafter the cam 184 moves out of contact with the roller 176 and the spring 177 pulls the slide back to retracted position.

I prefer to include in the apparatus an extractor mechanism to insure that the completed studs are removed from the apparatus, although the apparatus normally operates successfully in the absence of such mechanism.

When the extractor mechanism is included, the shaft 181 carries an additional cam 186, preferably secured thereto to rotate therewith in front of the cam 184, Fig. 1. A crank 187 is suitably pivoted to the inner face of the front member 91 of the carriage 85 and has an arm adapted to ride against the surface of the cam 186 and a second arm. A crank 188 is also pivoted to the inner face of the front member 91 rearwardly of the crank 187 and has an arm that is operatively connected to the second arm of the crank 187 by a rod 189 and a second arm. An extractor bar 190 is secured to a horizontally disposed shaft 191 pivotally mounted in suitable bearings 192 on the outer face of the side member 91 adjacent the rearward end thereof, Fig. 6. The extractor bar 190 is operatively connected with the second arm of crank 188 by a rod 193 which is pivotally connected to the bar inside of the pivotal mounting of the bar on the side member 91, Fig. 1.

The extractor bar extends transversely of the apparatus from the shaft 191 to a point just rearwardly of the gripping jaws 98 and 99, Fig. 6. A tension spring 194, connected between the rod 189 and the base 86 of the carriage 85, urges the rod 193 downwardly and thereby urges the extractor bar 190 downwardly, Fig. 1.

The extractor bar 190 is angle-shaped in cross section, having a lip, which in the upper position of the bar clears the upper edge of the disc held within the disc securing means on the slide member 154, Fig. 3. The bar is moved to its upper position to clear a disc held within the disc securing means by engagement of the crank 187 with the cam 186, the movement being transmitted through the rod 189, the crank 188 and the rod 193.

The cam 186 has a portion 195 of reduced radius at the end last engaged by the crank 187. When this portion of the cam reaches the crank 187, the crank moves thereinto and the extractor bar is moved downwardly so that the lip thereon engages over the disc, which at this time has been welded to the wire. This movement occurs as the slide 154 is about to start its movement back to retracted position. The engagement of the lip on the disc holds the disc and insures that the spring clips 156 and 157 will be sprung outwardly to release the disc. As the cam 186 continues to rotate, the crank 187 passes off from the raised surface thereof. The spring 194 pulls the extractor downwardly and knocks the completed stud from the apparatus through the delivery chute 162.

Figure 10:
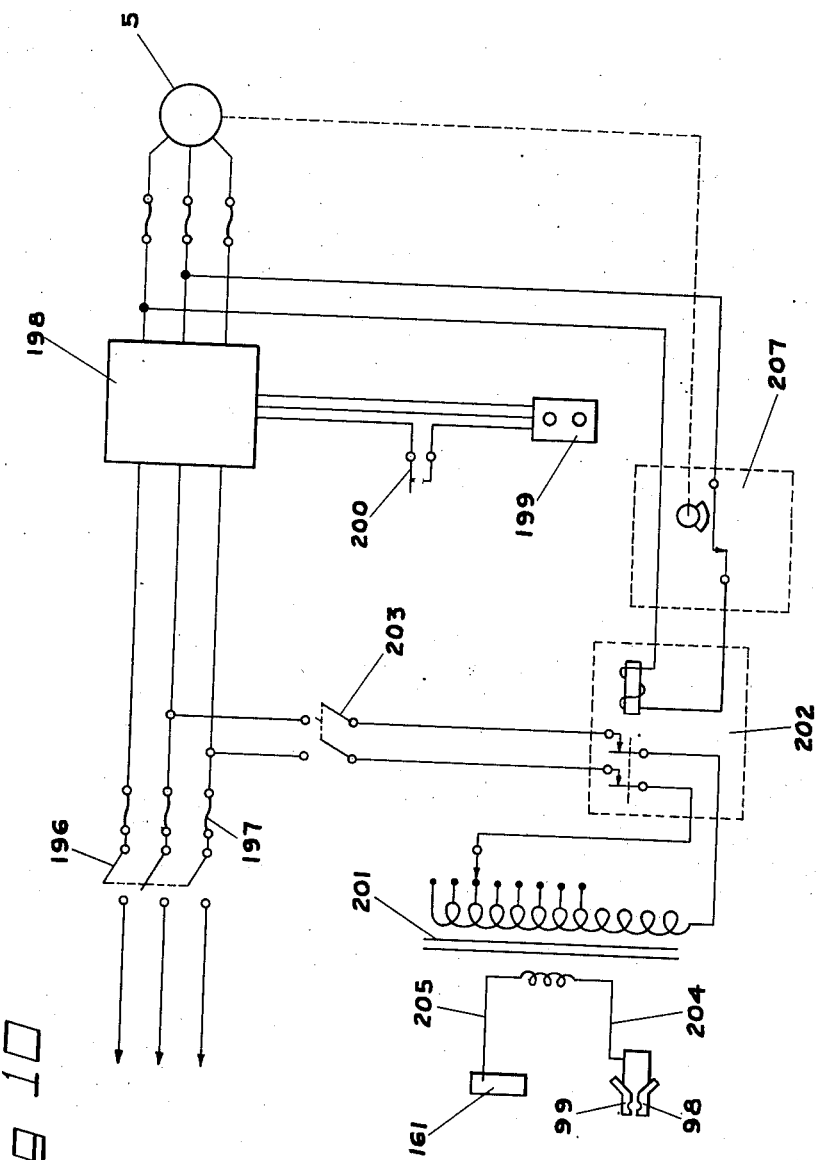
Fig. 10 is a diagrammatic view of the electric circuit preferably employed in the apparatus.

The apparatus is preferably electrically operated. In Fig. 10 I have shown diagrammatically a preferred electric circuit for the operation. It is to be understood, however, that this circuit is merely exemplary of a circuit that is suitable. I have shown a circuit adapted for use on three-phase alternating current, but it is obvious that suitable modifications could be made in the circuit to adapt the apparatus to be operated on other forms of electric current.

In the circuit illustrated, the three leads from a suitable source of three-phase alternating current enter a master switch 196, from which the current passes through fuses 197, into a motor starter 198, from which it passes to the motor 5 that operates the mechanical features of the apparatus. The master switch, fuses and motor starter may be placed in any convenient location on the apparatus. I have shown them as mounted on a suitable support on the back of the apparatus, Fig. 2.

A start-stop switch 199 is preferably provided as a convenient means of actuating the motor starter and is preferably located in a convenient place on the front of the apparatus, Fig. 1.

A safety cut-off switch 200 is preferably provided to stop the apparatus automatically when the supply of wire 16 is exhausted. The switch 200 is preferably mounted on one of the rails 29 rearward of the path of travel of the plate 30 thereon, Fig. 2. It remains closed as long as the wire 16 bears against it, but automatically opens when the supply of wire is exhausted. The position of the switch 200 in the circuit is shown in Fig. 10.

A transformer 201 is provided in the apparatus, preferably being mounted on the top member 4 in back of the carriage 85, Fig. 2. The leads to the primary coil of the transformer are connected thereto from a magnetic contactor 202, preferably suitably supported on the frame 1 in back of the transformer 201, Fig. 2. The magnetic contactor is connected between two of the leads to the motor starter, preferably through a switch 203 shown as mounted on a suitable support on the back of the apparatus, Fig. 2.

The relation between the primary and secondary coils of the transformer 201 is such that a current of high amperage suitable for electric resistance welding is produced in the secondary coil. One lead 204 from the rearward plate 95 of the wire gripping mechanism, Fig. 3. The current from this lead may pass through the plate 95, gripping jaws 98 and 99, inserts 102 and 103, to the wire 16. The other lead 205 is connected to the electrode 161, Fig. 3. The shelf 94 is electrically insulated from the rest of the apparatus by a suitable layer of insulation material 206, Fig. 6.

The magnetic contactor 202 is actuated by a cam operated timer 207, preferably mounted on the bearing 79 and operatively connected with the shaft 77, Fig. 2. The timer 207 closes the circuit to the primary coil of the transformer 201 through the contactor 202 after the slide 154 has reached its extended position and a disc is in contact with the end of the wire 16. The welding circuit is thus completed and the forward end of the wire 16 is fused or upset and welded to the disc. The timer opens the circuit to the primary coil of the transformer 201 just before the raised portion 185 of the cam 184 contacts the roller 176. By this time the weld has been completed and it cools while the additional pressure is applied by the raised portion 185 of the cam 184.

Preferably the relay coil of the magnetic contactor 202 and the timer 207 are cut into the circuit beyond the motor starter. This arrangement makes it necessary for the motor to be running before the welding circuit can be closed, such arrangement being a desirable safety feature.

I have not shown the detailed structure of the motor 5, the motor starter 198, the contactor 202, the timer 207, or the various switches for the reason that I employ devices well known in the art and which are not specifically a part of my invention.

Preferably the gripping mechanism, the electrode 161, and the transformer 201 are water cooled. Cold water preferably enters the gripping mechanism through connections 208 and passes out through connections 209, Fig. 4.

From the gripping mechanism, the cooling water preferably flows to the slide 154, entering through a connection 210 and leaving through a connection 211, Fig. 3. The water in the slide 154 flows through a tube therein into a bore in the electrode 161 and returns through the bore in the slide in which the tube is fitted.

From the slide 154 the water preferably flows through suitable cooling coils in the transformer 201.

In Figs. 8 and 9 I have shown completed studs of the type made by the apparatus. The stud shown in Fig. 8 comprises a shank 212, having a chisel point 213, and a completely flat head 214. The stud shown in Fig. 9 comprises a shank 215 having a chisel point 216, and a head 217 having an upturned outer edge.

*Operation*

A supply of wire 16 is wound around the reel 15 and manually pushed through the straightening mechanism, the wire feeding mechanism, the anti-return mechanism, the guide 58, the cutting mechanism and gripping mechanism. A supply of discs 132 is inserted in the magazine 131.

The master switch 196, the transformer switch 203, and the start-stop switch 199 are closed, thus starting the motor 5.

Rotation of the motor 5 rotates the drive shaft 9 in a counter-clockwise direction as viewed from the forward end of the apparatus. Rotation of the drive shaft 9 operates the wire feeding mechanism, the wire cutting mechanism and the wire gripping mechanism in a manner hereinbefore explained. Rotation of the drive shaft 9 also operates the disc feeding mechanism and the slide 154 in a manner hereinbefore explained to carry a disc into contact with the end of the cut segment of wire.

When the disc is in such position, the timer 207 actuates the magnetic contactor 202 to complete the welding circuit. The disc is welded to the end of the cut segment of wire. The timer 207 actuates the contactor 202 to break the welding circuit.

The slide 154 is pulled back to retracted position by the spring 177 after the cam 184 passes out of contact with the roller 176. By this time the disc has been welded to the cut segment of wire to form a completed stud. The spring clips 156 and 157 are sprung out of engagement with the stud head and at the same time the wire gripping mechanism releases the stud shank. The completed stud is free to drop out of the apparatus from the delivery chute 162.

When the extractor mechanism is employed, the lip on the extractor bar 190 drops over the disc or stud head as the slide 154 starts to return to retracted position. This engagement insures that the spring clips 156 and 157 release the stud head. The extractor bar then forces the stud out of the apparatus.

It is apparent that the operation of the various mechanisms in the apparatus must be properly synchronized. At the completion of the feed stroke of the plate 30, the gripping jaws 98 and 99 close on the wire. Thereafter the cutting mechanism cuts the segment from the wire. A disc is fed to the slide 154, and the latter starts its travel to extended position during the feed stroke of the plate 30. The disc comes into contact with the wire after the gripping jaws close thereon. The timer 207 closes the contactor 202 to complete the welding circuit after the disc contacts the end of the wire and breaks the circuit while the electrode is still in contact with the disc. The extractor mechanism operates to remove the stud as the slide starts to move back to retracted position. The return stroke of the plate 30 starts shortly after completion of the feed stroke.

The synchronization is accomplished by gearing the shafts 37, 77, 114 and 181 to rotate at the same speed and by proper adjustment of the parts thereon.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. An apparatus for the manufacture of studs comprising a frame, a drive shaft mounted to rotate on said frame, means to rotate said drive shaft, means supported on said frame for carrying a supply of wire, means supported on said frame and operatively connected with said drive shaft for feeding wire intermittently from said carrying means into said apparatus, means for straightening the wire, means supported on said frame for cutting the wire to predetermined lengths including a pair of movable cutting elements operatively connected with said drive shaft, a carriage mounted adjustably on said frame, means supported on said carriage for gripping the wire periodically including a pair of movable jaws and pneumatic means operatively connected with said drive shaft for closing and opening said jaws, a disc magazine supported on said carriage, a slide mounted for reciprocating movement on said carriage to move between retracted and extended positions, spring means normally urging said slide to retracted position, means carried by said slide for releasably securing a disc in position to contact the end of wire held by said wire gripping means, means operatively connected with said drive shaft to feed discs singly from said magazine to said disc securing means, a welding electrode carried by said slide adapted to contact a disc held within said disc securing means, cam means mounted to rotate on said frame operatively connected with said drive shaft and adapted to act periodically on said slide and move the latter to extended position against the action of said spring means, the disc held within said disc securing means contacting the end of wire held by said wire gripping means when said slide is in extended position, the welding electrode and wire gripping means being electrically connected to a source of electric current of welding intensity, said disc securing means releasing the disc on the return movement of the slide, and means operatively connected with said drive shaft for removing a completed stud from the apparatus.

2. An apparatus for the manufacture of studs comprising a frame, a drive shaft mounted to rotate on said frame, means to rotate said drive shaft, means supported on said frame for carrying a supply of wire, means operatively connected with said drive shaft for intermittently feeding wire from said carrying means into said apparatus, means supported on said frame for cutting the wire to predetermined lengths including a pair of movable cutting elements operatively connected with said drive shaft, means supported on said frame for gripping the wire periodically including a pair of movable jaws and means operatively connected with said drive shaft for closing and opening said jaws, a disc magazine supported on said frame, a slide supported for reciprocating movement on said frame to move between retracted and extended positions, means normally urging said slide to retracted position, means carried by said slide for releasably securing a disc in position to contact the end of wire held by said wire gripping means, means operatively connected with said drive shaft to feed discs singly from said magazine to said disc securing means, a welding electrode carried by said slide adapted to contact a disc held within said disc securing means, and cam means mounted to rotate in said frame operatively connected with said drive shaft and adapted to act periodically on said slide and move the latter to extended position, the disc held within said disc securing means contacting the end of wire held by said wire gripping means when said slide is in extended position, the welding electrode and wire gripping means being electrically connected to a source of electric current of welding intensity.

3. An apparatus for the manufacture of studs comprising a frame, a drive shaft mounted to rotate on said frame, means to rotate said drive shaft, means supported on said frame for feeding wire into said apparatus, means supported on said frame for cutting the wire to predetermined lengths, means for gripping the wire periodically including a guide supported on said frame, a pair of jaws pivoted to said guide, a crosshead slidable in said guide, links connecting said crosshead to said jaws, a double acting pneumatic cylinder supported on said frame and adapted to be connected to a source of compressed air, a piston in said cylinder, a piston rod connecting said piston and said crosshead, and a valve on said cylinder to control flow of air and operation of said piston, said valve having an operative connection with said drive shaft, whereby rotation of said drive shaft closes and opens said jaws to alternately grip and release the wire, disc feeding means, means for releasably securing a disc in position to contact wire held by said wire gripping means, and means for welding a disc to the wire.

4. An apparatus for the manufacture of studs comprising a frame, a drive shaft mounted to rotate on said frame, means to rotate said drive shaft, means supported on said frame for feeding wire into said apparatus, means supported on said frame for cutting the wire to predetermined lengths, wire gripping means supported on said frame, disc feeding means, a slide supported for reciprocating movement on said frame to move between retracted and extended positions, a crank pivoted to said frame and to said slide, spring means connected to said frame and said crank normally urging said slide to retracted position, means carried by said slide for releasably securing a disc in position to contact wire held by said wire gripping means, a welding electrode carried by said slide, and cam means mounted to rotate in said frame operatively connected with said drive shaft and adapted to act periodically on said crank and move said slide to extended position against the action of said spring means.

5. An apparatus for the manufacture of studs comprising a frame, a drive shaft mounted to rotate on said frame, means to rotate said drive shaft, means supported on said frame for feeding wire into said apparatus, means supported on said frame for cutting the wire to predetermined lengths, wire gripping means supported on said frame, disc feeding means, a transformer supported on said frame adapted to supply current of welding intensity, said wire gripping means being electrically connected to said transformer to transmit current of welding intensity to the wire, a slide supported for reciprocating movement on said frame to move between retracted and extended positions, spring means normally urging said slide to retracted position, means carried by said slide for releasably securing a disc in position to contact wire held by said wire gripping means, a welding electrode carried by said slide and being electrically connected to said transformer, cam means mounted to rotate on said frame operatively connected with said drive shaft and adapted to act periodically on said slide to move the latter to extended position against the action of said spring means, whereby the electrode contacts a disc held by said disc securing means and such disc contacts the end of the wire, and means to make and break the welding circuit while the slide is in extended position.

6. An apparatus for the manufacture of studs comprising a frame, a drive shaft mounted to rotate on said frame, a second shaft transverse to the drive shaft and geared to rotate therewith and having a crank and a cam thereon, a third shaft transverse to the drive shaft and geared to rotate therewith and having at least one cam thereon, means to rotate said drive shaft, means supported on said frame and operatively connected with said drive shaft for intermittently feeding wire into said apparatus, means supported on said frame and operatively connected with said drive shaft for cutting the wire to predetermined lengths, means supported on said frame for gripping the wire periodically including a pair of movable jaws, pneumatic means operatively connected to said jaws for closing and opening the jaws, a valve controlling said pneumatic means operated by the cam on said second shaft, means for carrying a supply of discs supported on said frame, a slide supported for reciprocating movement on said frame to move between retracted and extended positions, spring means normally urging said slide to retracted position, means carried by said slide for releasably securing a disc in position to contact wire held by said wire gripping means, means for feeding discs singly from said disc carrying means to said disc securing means operatively connected with the crank on said second shaft, and a welding electrode carried by said slide, the cam on said third shaft being adapted to act periodically on said slide and move the latter to extended position against the action of said spring means.

7. An apparatus for the manufacture of studs comprising a frame, a drive shaft mounted to rotate on said frame, means to rotate said drive shaft, means supported on said frame and operatively connected with the drive shaft for intermittently feeding wire into said apparatus and being adjustable to vary the length of wire fed into the apparatus, means supported on said frame in a position fixed relative thereto to cut lengths from the wire substantially equal to the lengths of wire fed into the apparatus, a carriage supported on said frame for adjustment thereon to compensate for varied lengths of wire fed into the apparatus, means supported on said carriage for gripping the wire periodically adjacent the end thereof, disc feeding means, means for releasably securing a disc in position to contact the end of wire held by said wire gripping means, and means for welding a disc to the wire.

8. An apparatus for the manufacture of studs comprising a frame, a drive shaft mounted to rotate on said frame, means to rotate said drive shaft, means supported on said frame for feeding wire into said apparatus, means supported on said frame for cutting the wire to predetermined lengths, wire gripping means supported on said frame, a slide supported for reciprocating movement on said frame to move between retracted and extended positions, a plurality of spring clips carried by said slide in spaced relationship to each other adapted to releasably secure a disc in the space therebetween, a disc magazine supported on said frame, a chute extending downwardly from said disc magazine, spring means normally urging said slide to retracted position, the space within said spring clips being substantially aligned with the outlet of said chute when said slide is in retracted position, means for feeding discs singly from said magazine into said chute and thence into the space within said spring clips, a welding electrode carried by said slide adapted to contact a disc held within said spring clips, and cam means mounted to rotate in said frame operatively connected with said drive shaft and adapted to act periodically on said slide and move the latter to extended position against the action of said spring means, the disc held within said spring clips contacting the end of wire held by said wire gripping means at the extended position of said slide, the welding electrode and the wire gripping means being electrically connected to a source of electric current of welding intensity, said spring clips releasing the disc on the return stroke of the slide.

9. An apparatus of the character described, for successively forming welded articles from material and parts, comprising a welding unit, means for successively advancing material toward said welding unit, means adjustable to vary the length of material advanced, means for successively feeding parts toward said welding unit to contact said material and be welded thereto, and means whereby the relative positions of said material advancing means and said part feeding means may be varied to compensate for the varied lengths of material advanced so that said parts and said material are always brought into proper contact for welding.

10. An apparatus of the character described, comprising means for intermittently feeding wire, said means being adjustable for varying the length of wire so fed, a carriage adjustably supported relative to said wire feeding means, means supported on said carriage for gripping the wire periodically adjacent the end thereof, means on said carriage to releasably secure a part for contact with the end of wire held in said gripping means for welding thereto, and means to adjust the position of said carriage relative to said wire feeding means to compensate for the varied lengths of wire fed, whereby said part and said wire end are always brought into proper welding contact.

ARTHUR J. RANDOLPH.

REFERENCES CITED

The following references are of record in the file of this patent:

UNITED STATES PATENTS

| Number | Name | Date |
|---|---|---|
| 1,119,553 | Vaughan | Dec. 1, 1914 |
| 1,897,970 | Hofmann et al. | Feb. 14, 1933 |
| 1,999,617 | Randall | Apr. 30, 1935 |
| 2,203,287 | Smith | June 4, 1940 |
| 2,316,597 | Kershaw | Apr. 13, 1943 |
| 2,339,884 | Schlumpf | Jan. 25, 1944 |
| 2,394,599 | Edelman et al. | Feb. 12, 1946 |

Certificate of Correction

Patent No. 2,473,543

June 21, 1949

ARTHUR J. RANDOLPH

It is hereby certified that errors appear in the printed specification of the above numbered patent requiring correction as follows:

Column 4, line 2, for "wire 1" read *wire 16*; column 5, line 30, for "therewtih" read *therewith*; column 14, line 8, for "whcih" read *which*;
and that the said Letters Patent should be read with these corrections therein that the same may conform to the record of the case in the Patent Office.

Signed and sealed this 14th day of March, A. D. 1950.

[SEAL]

THOMAS F. MURPHY,
*Assistant Commissioner of Patents.*